(12) United States Patent
Betting et al.

(10) Patent No.: US 8,002,878 B2
(45) Date of Patent: Aug. 23, 2011

(54) CYCLONIC SEPARATOR AND METHOD FOR DEGASSING A FLUID MIXTURE

(75) Inventors: Marco Betting, Rijswijk (NL); Gerhardus Willem Colenbrander, Amsterdam (NL); Michael Alvin Curole, Baton Rouge, LA (US); Theodorus Cornelis Klaver, Rijswijk (NL); Eric Johannes Puik, Rijswijk (NL)

(73) Assignee: Shell Oil Company, Houston, TX (US)

( * ) Notice: Subject to any disclaimer, the term of this patent is extended or adjusted under 35 U.S.C. 154(b) by 771 days.

(21) Appl. No.: 11/794,433

(22) PCT Filed: Dec. 29, 2005

(86) PCT No.: PCT/EP2005/057218
§ 371 (c)(1),
(2), (4) Date: May 13, 2008

(87) PCT Pub. No.: WO2006/070019
PCT Pub. Date: Jul. 6, 2006

(65) Prior Publication Data
US 2008/0289502 A1 Nov. 27, 2008

(30) Foreign Application Priority Data
Dec. 30, 2004 (EP) ..................................... 04107068

(51) Int. Cl.
*B01D 19/00* (2006.01)
(52) U.S. Cl. ............................................. 95/261; 96/195
(58) Field of Classification Search .................... 95/261; 96/195, 184
See application file for complete search history.

(56) References Cited

U.S. PATENT DOCUMENTS

| 2,664,963 | A | * | 1/1954 | Lovelady et al. | 96/184 |
| 2,771,157 | A | | 11/1956 | Gustavsson | 183/38 |
| 2,811,219 | A | | 10/1957 | Wenzl | 183/2.5 |
| 3,255,574 | A | * | 6/1966 | Glasgow | 95/252 |
| 3,488,927 | A | | 1/1970 | Jepsen et al. | 55/237 |

(Continued)

FOREIGN PATENT DOCUMENTS

DE 3715157 11/1988

(Continued)

OTHER PUBLICATIONS

International Search Report Mar. 20, 2006.

*Primary Examiner* — Duane Smith
*Assistant Examiner* — Douglas J Theisen

(57) ABSTRACT

A method and cyclonic separator are disclosed for degassing a fluid mixture comprising a carrier liquid and one or more gaseous and/or vaporizable components, wherein: —the fluid mixture is accelerated in a throat section (6) of a vortex tube (1) such that the static pressure of the fluid mixture is decreased and vaporizable components evaporate into a gaseous phase; —the accelerated fluid mixture is induced to swirl within the vortex tube such that the fluid mixture is separated by centrifugal forces into a degassed liquid fraction and a gas enriched fraction; —the degassed liquid fraction is induced to flow into a liquid outlet conduit (4) which is located at or near the outer circumference of the vortex tube (1); and—the gas enriched fraction is induced to flow into a gas outlet conduit (3) which is located at or near a central axis of the vortex tube (1).

15 Claims, 2 Drawing Sheets

U.S. PATENT DOCUMENTS

| | | |
|---|---|---|
| 4,072,481 A | 2/1978 | Laval, Jr. .................. 55/177 |
| 4,596,586 A | 6/1986 | Davies et al. ............... 55/52 |
| 5,064,448 A | 11/1991 | Choi ........................... 55/38 |
| 5,203,891 A | 4/1993 | Lema ......................... 55/205 |
| 6,214,092 B1 * | 4/2001 | Odom et al. ................ 95/253 |
| 6,402,799 B1 | 6/2002 | Kokubo et al. ............. 55/396 |
| 6,517,732 B1 * | 2/2003 | Brockoff et al. ............ 210/782 |

FOREIGN PATENT DOCUMENTS

| | | |
|---|---|---|
| EP | 400202 | 12/1990 |
| GB | 2035150 | 6/1980 |
| WO | WO9324204 | 12/1993 |
| WO | WO9901194 | 1/1999 |
| WO | WO0023757 | 4/2000 |
| WO | WO03002227 | 1/2003 |
| WO | WO03029739 | 4/2003 |
| WO | WO 03/055575 A1 * | 7/2003 |
| WO | WO03055575 | 7/2003 |
| WO | WO03092850 | 11/2003 |

* cited by examiner

CYCLONIC SEPARATOR AND METHOD FOR DEGASSING A FLUID MIXTURE

FIELD OF THE INVENTION

The invention relates to a cyclonic separator and method for degassing a fluid mixture.

BACKGROUND OF THE INVENTION

U.S. Pat. No. 6,402,799 discloses a cyclonic separator in which a gas-liquid mixture is injected via a tangential inlet into a horizontal vortex tube in which the gaseous and liquid fractions are at least partly separated and the liquid fraction forms a film alongside the inner wall of the vortex tube and is discharged via a radial outlet, whereas the gaseous fraction is concentrated near the central axis of the vortex tube and discharged via a central outlet.

International patent applications WO9901194 and WO03029739 disclose cyclonic separators wherein a gas stream is accelerated in a vortex tube to a near sonic or supersonic velocity and thereby expanded and adiabatically cooled such that liquid or solid particles are formed which are discharged via an outlet at the outer circumference of the tube, whereas a dry gas fraction is discharged via a central outlet. These known separators are configured to remove liquefied and/or solidified components from a gas stream and not to remove a gaseous fraction from a carrier liquid.

UK patent GB2035150; U.S. Pat. Nos. 2,811,219 and 4,596,586 and International patent application WO03055575 disclose cyclonic separators in which a gas-liquid mixture is injected via a tangential inlet into a vertical vortex tube which has at its upper end a central gas outlet conduit via which the gaseous fraction is discharged and at its lower end a liquid collecting basin which is connected to a liquid discharge conduit.

A disadvantage of the latter group of cyclonic separators is that they generally are large pieces of equipment and have a limited separation efficiency. German patent application DE 3715157 suggests a cyclonic separator for separating gaseous components from a liquid wherein the liquid is injected via a tangential inlet into a tubular gas-liquid separation chamber which comprises at one end a liquid outlet and at an opposite end a gas outlet. A disadvantage of this known separator is that the liquid is first induced to swirl at the entrance of the separation chamber and then accelerated in a converging annular throat section, which reduces the gas-liquid separation efficiency.

International patent application WO 03/002227 suggests a cyclonic liquid degassing separator in which a liquid stream is first induced to swirl by swirl imparting vanes arranged in an inlet conduit and the swirling liquid stream is then accelerated in a converging throat section in which substantially liquid and gaseous fractions are formed, whereupon the gaseous fraction is discharged through a central gas outlet conduit and the liquid fraction is discharged through an annular liquid outlet conduit. A disadvantage of this method is that the liquid stream is first induced to swirl and then accelerated in the converging throat section, which reduces the gas-liquid separation efficiency.

SUMMARY OF THE INVENTION

In accordance with the invention there is provided a method for degassing a fluid mixture comprising a carrier liquid and one or more gaseous and/or vaporizable components in a cyclonic separator in which:

accelerating the fluid mixture in a throat section of a vortex tube such that the static pressure of the fluid mixture is decreased and vaporizable components evaporate into a gaseous phase;

inducing the fluid mixture to swirl within the vortex tube such that the fluid mixture is separated by centrifugal forces into a degassed liquid fraction and a gas enriched fraction;

inducing the degassed liquid fraction to flow into a liquid outlet conduit which is located at or near the outer circumference of the vortex tube; and inducing the gas enriched fraction to flow into a gas outlet conduit which is located at or near a central axis of the vortex tube;

wherein the fluid mixture comprises crude oil as carrier liquid and the gaseous or vaporizable components comprise natural gas or condensates such as methane, ethane, propane, butane and pentane, carbon dioxide and/or hydrogen sulfide.

In different embodiments of the method according to the invention:

the degassed liquid is induced to flow in a swirling motion along the inner surface of the vortex tube in downstream direction from a proximal end towards a distal end of the vortex tube and is discharged via an annular liquid outlet conduit which is arranged co-axially between a bullet-shaped deflection body and the inner surface of the distal end of the vortex tube;

the gas enriched fraction is induced to flow in a countercurrent swirling motion from a nose section of the bullet-shaped deflection body towards the gas outlet conduit which is arranged co-axially within the proximal end of the vortex tube; and the vortex tube has a trumpet-shaped proximal end which is connected to a fluid inlet tube, such that an annular fluid inlet conduit is formed which co-axially surrounds the wall of the gas outlet conduit and in which conduit the fluid mixture is accelerated and a series of swirl-imparting vanes are arranged which induce the accelerated fluid mixture to flow in a swirling motion into the vortex tube.

The gas outlet conduit may have a ring-shaped entrance which performs as a vortex finder for the countercurrent swirling motion of the gas enriched fraction stream around a central axis of the vortex tube, which countercurrent swirling motion is induced at the edge of the nose section of the bullet-shaped deflection body by means of the Ranque-Hills effect.

The bullet-shaped deflection body may have a conical nose section and a substantially cylindrical tail section, and the distal end of the vortex tube may have an in downstream direction diverging shape.

The gas outlet conduit may be co-axially arranged around a torpedo-shaped central body having conical nose and tail sections and a substantially cylindrical mid section; and the gas enriched fraction in the gas outlet conduit may be deswirled by an assembly of flow deswirling vanes which is arranged in the gas outlet conduit between the outer surface of the central body and the inner surface of the wall of the gas outlet conduit.

Optionally the swirl-imparting vanes are arranged in a section of the annular fluid inlet conduit in which the fluid inlet tube has a larger inner diameter than other parts of the fluid inlet tube, which vanes induce the fluid mixture to flow at a subsonic velocity through the annular fluid inlet conduit and the fluid mixture is accelerated to a substantially transonic or supersonic velocity in the trumpet-shaped proximal end of the vortex tube.

The method according to the invention may be configured to degas a fluid mixture which comprises crude oil as carrier liquid which carries gaseous and/or vaporizable components comprising natural gas and/or condensates such as methane, ethane, propane, butane and pentane, carbon dioxide and/or hydrogen sulfide.

A cyclonic separator for degassing a fluid mixture comprising a carrier liquid and one or more gaseous and/or vaporizable components comprises:

a vortex tube having a throat section in which the fluid mixture is accelerated such that the static pressure of the fluid mixture is decreased and vaporizable components evaporate into a gaseous phase;

one or more swirl imparting vanes for inducing the fluid mixture to swirl within the vortex tube thereby inducing the mixture to be separated by centrifugal forces into a degassed liquid fraction and a gas enriched fraction;

a degassed liquid outlet conduit which is located at or near the outer circumference of the vortex tube for discharging the degassed liquid fraction; and a gas outlet conduit which is located at or near a central axis of the vortex tube for discharging the gas enriched fraction;

wherein said one or more swirl imparting vanes are arranged downstream of the throat section in which the fluid mixture comprising a carrier liquid and one or more gaseous or vaporizable components is accelerated.

These and other features and embodiments of the method and cyclonic separator according to the invention are described in the accompanying claims, abstract and following detailed description in which reference is made to the accompanying drawings.

DETAILED DESCRIPTION OF EMBODIMENTS OF THE INVENTION

Figure 1:
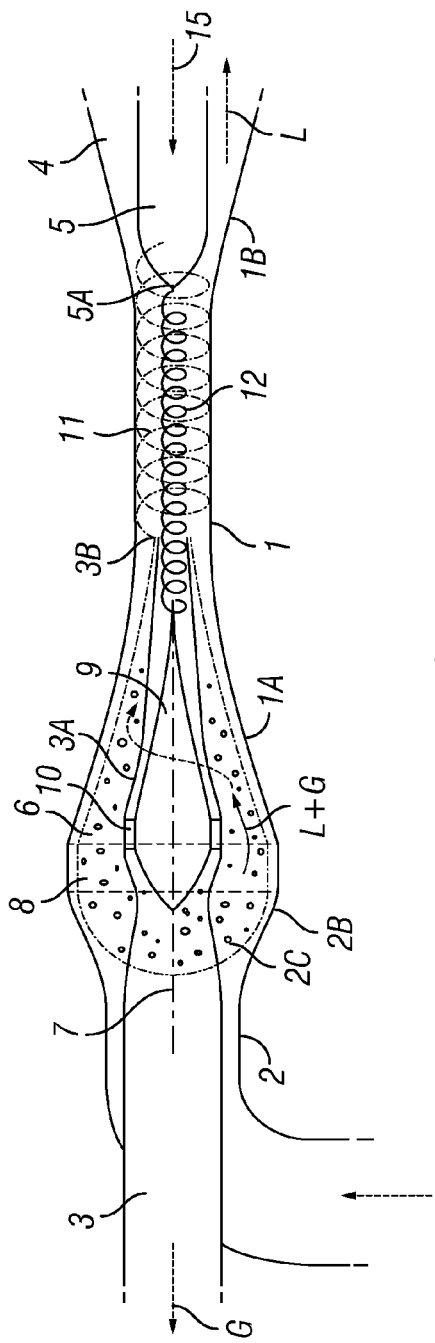
FIG. 1 depicts a schematic longitudinal sectional view of an embodiment of a cyclonic liquid degassing separator according to the invention in which a fluid mixture is degassed and separated and separated the degassed liquid fraction L and the gaseous fraction G are discharged at opposite ends of the separator.

FIG. 1 depicts a cyclonic liquid degassing separator, which comprises a vortex tube 1, an untreated fluid inlet conduit 2, a gas outlet conduit 3 and a degassed liquid outlet conduit 4.

The vortex tube 1 has a trumpet-shaped proximal end 1A and a diverging distal end 1B.

The liquid outlet conduit 4 is formed by an annular space between the inner surface of the diverging distal end 1B of the vortex tube 1 and a bullet-shaped deflection body 5.

The trumpet-shaped proximal end 1A of the vortex tube 1 is connected to the diverging outer wall 2B of the fluid inlet conduit 2.

A series of swirl imparting vanes 8 is arranged in the diverging annular end-section 2C of the inlet conduit 2, which vanes 8 induce the untreated fluid to swirl into an annular throat section 6 formed between the inner surface of the trumpet-shaped proximal end 1A of the vortex tube 1 and the outer surface of the wall 3A of the gas outlet conduit 3.

The annular throat section 6 has a gradually decreasing cross-sectional area and thus acts as a so-called Laval nozzle in which the liquid is accelerated to a subsonic, or preferably to a transonic or supersonic velocity. In the accelerated fluid mixture the fluid will expand and the static pressure will drop, so that the dissolved or free gas fraction in the carrier liquid will evaporate and liquid flow is transformed into a bubbly flow of carrier liquid and gas bubbles L+G.

Simultaneously, the swirl imparting vanes 8 will impose a swirling motion on the bubbly flow L+G, which is enhanced by the gradual decrease of the outer diameter of the annular throat section 6 as a result of the conservation of moment of momentum, which is also known as the spinning ice skater effect. The swirling motion may impose centrifugal forces of 100,000 g on the bubbly flow L+G causing the low density gas bubbles G to migrate towards the central axis 7 of the vortex tube 1 and the high density liquid fraction L to migrate towards the tubular inner surface of the vortex tube 1.

The high-density liquid fraction L will spin as an annular film 11 along the tubular inner surface of the vortex tube 1 into the liquid outlet conduit 4. The gas bubbles G will coalesce and form a continuous gaseous phase near the central axis 7 of the vortex tube 1, which gaseous phase will hit the pointed nose section 5A of the bullet-shaped deflection body 5 which is then deflected and induced by the Ranque-Hills effect to flow as a countercurrent swirl 12 from the pointed nose section 5A in a direction from the distal end 1B towards the proximal end 1A of the vortex tube 1 into the gas outlet conduit 3. The ring-shaped co-axial entrance 3B of the gas outlet conduit 3 will perform as a vortex seeker for the gaseous stream G. A torpedo-shaped central body 9 is arranged within the gas outlet conduit 3 and a series of deswirling vanes 10 will deswirl and straighten the gaseous stream G within said conduit 3.

The bullet shaped deflection body 5 can be axially moved within the diverging distal end 1B of the vortex tube, as illustrated by arrow 15, so that the width of the annular liquid outlet conduit 4 and the flow rate of the degassed liquid L can be adjusted.

Figure 2:
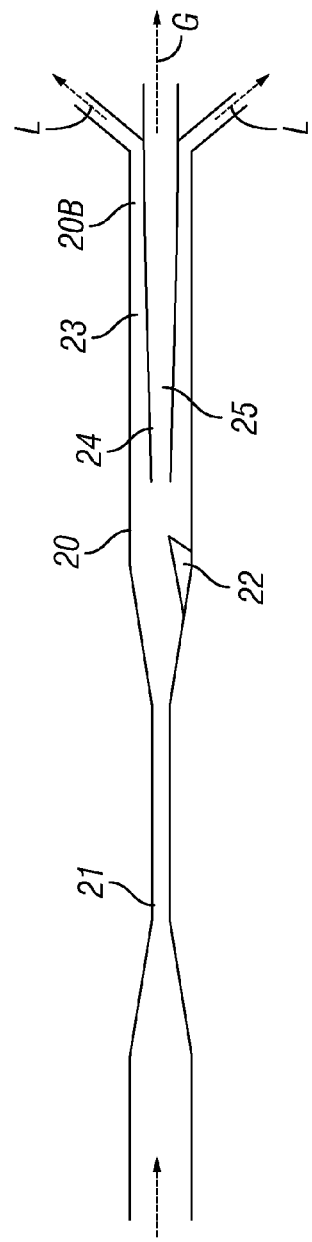
FIG. 2 depicts a schematic longitudinal sectional view of another embodiment of a cyclonic liquid degassing separator according to the invention in which a fluid mixture is degassed and separated and the degassed liquid fraction L and the gaseous fraction G are both discharged at the same end of the separator.

FIG. 2 depicts an alternative embodiment of the cyclonic liquid degassing separator which comprises a vortex tube 20 having a narrow throat section 21 in which the a fluid mixture of a carrier liquid and dissolved gaseous and/or vaporizable components is accelerated to a near-sonic or supersonic velocity and swirled by one or more swirl imparting vanes 22, so that the vaporizable components evaporate and the high-density liquid fraction L is separated from the low density gaseous fraction G by centrifugal forces. The high-density liquid fraction will form a swirling annular film alongside the inner surface of the vortex tube 20 which is discharged from the vortex tube 20 via an annular outlet conduit 23, which is formed between the inner surface of a distal end 20B of the vortex tube 20 and the outer surface of the wall 24 of a central gas outlet conduit 25 through which the gaseous fraction G is discharged.

A gas/liquid gravity separation assembly (not shown) comprising mechanical weirs under and over flow systems may separate the three phases: oil, water and residual gas discharged by the annular outlet conduit 23. The gas pressure equalises the pressure for the three phases and the differences in specific gravity provides the difference in gas/liquid and oil/water levels for separation. The different heights of the weirs traps one of the phases upstream of the weir and another phase will pass under and over the weir.

Figure 3:
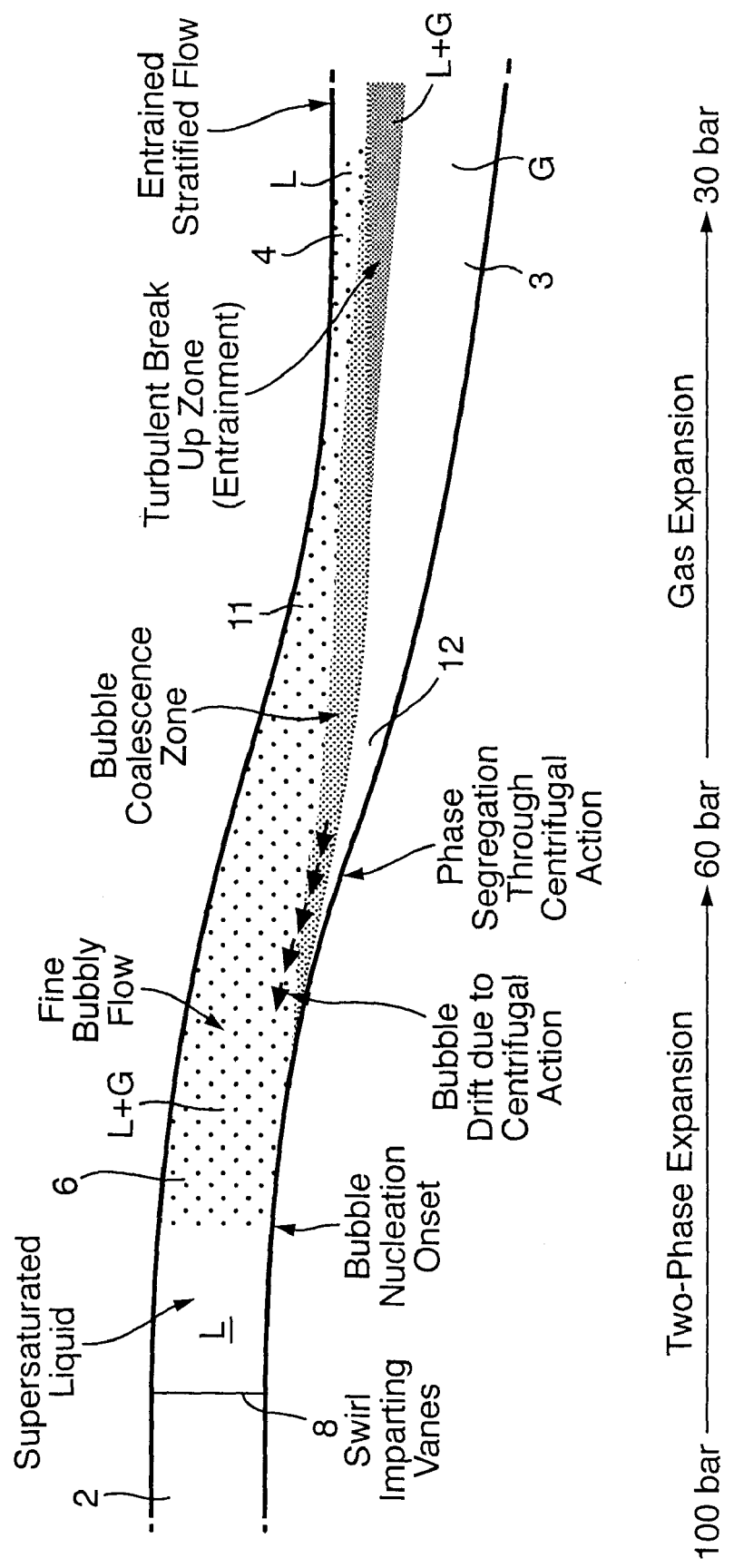
FIG. 3 shows expected flow regimes and pressures in different parts of the cyclonic liquid degassing separator.

FIG. 3 is a schematic view of the fluid flow and static pressure reduction in the cyclonic liquid degassing separator according to the invention. It illustrates how in the separator depicted in FIG. 1 the liquid flow is transformed into a fine bubbly flow within the throat section 6 and segregated into an annular swirling liquid fraction L and a central counterswirling gas fraction G. The pressure of the injected liquid mixture may be about 100 bar and the pressure of the discharged gaseous fraction in the gas outlet conduit 3 may be about 30 bar.

What is claimed is:

1. A method for degassing a fluid mixture comprising a carrier liquid and one or more gaseous or vaporizable components in a cyclonic separator, the method comprising the steps of:

accelerating the fluid mixture in a throat section of a vortex tube such that the static pressure of the fluid mixture is decreased and vaporizable components evaporate into a gaseous phase;

inducing the fluid mixture to swirl within the vortex tube such that the fluid mixture is separated by centrifugal forces into a degassed liquid fraction (L) and a gas enriched fraction (G);

inducing the degassed liquid fraction (L) to flow into a liquid outlet conduit which is located at or near the outer circumference of the vortex tube; and inducing the gas enriched fraction (G) to flow into a gas outlet conduit, which is located at or near a central axis of the vortex tube;

wherein the fluid mixture comprises crude oil as carrier liquid and the gaseous or vaporizable components comprise components selected from the group consisting of natural gas, methane, ethane, propane, butane and pentane, carbon dioxide, and hydrogen sulfide.

2. The method of claim 1, wherein the accelerated fluid mixture is induced to swirl by one or more swirl imparting vanes that are arranged within the vortex tube.

3. The method of claim 1, wherein the degassed liquid (L) is induced to flow in a swirling motion along the inner surface of the vortex tube in downstream direction from a proximal end towards a distal end of the vortex tube and is discharged via an annular liquid outlet conduit, which is arranged co-axially between a bullet-shaped deflection body and the inner surface of the distal end of the vortex tube;

the gas enriched fraction (G) is induced to flow in a countercurrent swirling motion from a nose section of the bullet-shaped deflection body towards the gas outlet conduit which is arranged co-axially within the proximal end of the vortex tube; and the vortex tube has a trumpet-shaped proximal end, which is connected to a fluid mixture inlet tube, such that an annular fluid mixture inlet conduit is formed, which co-axially surrounds the wall of the gas outlet conduit, in which conduit a series of swirl-imparting vanes are arranged which induce the accelerated fluid mixture to flow in a swirling motion into the vortex tube.

4. The method of claim 3, wherein the bullet-shaped deflection body has a conical nose section and a substantially cylindrical tail section, and the distal end of the vortex tube has an in downstream direction diverging shape.

5. The method of claim 3, wherein the gas outlet conduit is co-axially arranged around a torpedo-shaped central body having conical nose and tail sections and a substantially cylindrical mid section; and the gas enriched fraction in the gas outlet conduit is deswirled by an assembly of flow deswirling vanes which is arranged in the gas outlet conduit between the outer surface of the central body and the inner surface of the wall of the central gas outlet conduit.

6. The method of claim 5, wherein the gas outlet conduit has a ring-shaped entrance which performs as a vortex finder for the countercurrent swirling motion of the gas enriched fraction stream around a central axis of the vortex tube, which countercurrent swirling motion is induced at the edge of the nose section of the bullet-shaped deflection body by means of the Ranque-Hills effect.

7. The method of claim 3, wherein the swirl-imparting vanes are arranged in a section of the annular fluid inlet conduit in which the fluid inlet tube has a larger inner diameter than other parts of the fluid inlet tube, which vanes induce the fluid mixture to flow at a subsonic velocity through the annular fluid inlet conduit and the fluid mixture is accelerated to a substantially transonic or supersonic velocity in the trumpet-shaped proximal end of the vortex tube.

8. The method of claim 1, wherein the fluid mixture is first accelerated in the throat section and the accelerated fluid mixture is subsequently induced to swirl within the vortex tube.

9. A cyclonic separator for degassing a fluid mixture comprising a carrier liquid and one or more gaseous and/or vaporizable components, comprising:

a vortex tube having a throat section in which the fluid mixture is accelerated such that the static pressure of the fluid mixture is decreased and vaporizable components evaporate into a gaseous phase;

one or more swirl imparting vanes for inducing the fluid mixture to swirl within the vortex tube thereby inducing the mixture to be separated by centrifugal forces into a degassed liquid fraction (L) and a gas enriched fraction (G);

a degassed liquid outlet conduit which is located at or near the outer circumference of the vortex tube for discharging the degassed liquid fraction (L); and a gas outlet conduit which is located at or near a central axis of the vortex tube for discharging the gas enriched fraction (G);

wherein the fluid mixture comprises crude oil as carrier liquid and the gaseous or vaporizable components comprise components selected from the group consisting of natural gas, methane, ethane, propane, butane and pentane, carbon dioxide, and hydrogen sulfide.

10. The cyclonic separator of claim 9, wherein said one or more swirl imparting vanes are arranged in the vortex tube.

11. The cyclonic separator of claim 9, wherein the vortex tube comprises a proximal end and a distal end;

the separator comprises one or more swirl imparting vanes for inducing the fluid mixture to flow in swirling motion in downstream direction along the inner surface of the vortex tube from the proximal end towards the distal end of the vortex tube;

the liquid outlet conduit has an annular shape and is co-axially arranged between a bullet-shaped deflection body and the inner surface of the distal end of the vortex tube;

the gas outlet conduit is arranged co-axially within the proximal end of the vortex tube;

the bullet-shaped deflection body comprises a nose section for inducing the gas enriched fraction (G) to flow in a countercurrent swirling motion from the nose section of the bullet-shaped deflection body towards the gas outlet conduit; and the vortex tube has a trumpet-shaped proximal end which is connected to a fluid inlet tube, such that an annular fluid inlet conduit is formed, which co-axially surrounds the wall of the gas outlet conduit, in which conduit a series of swirl-imparting vanes are arranged which induce the accelerated fluid mixture to flow in a swirling motion into the vortex tube.

12. The cyclonic separator of claim 11, wherein the bullet-shaped deflection body has a substantially cylindrical tail section and the distal end of the vortex tube has an in downstream direction diverging shape.

13. The cyclonic separator of claim 11, wherein the gas outlet conduit is co-axially arranged around a torpedo-shaped central body having conical nose and tail sections and a substantially cylindrical mid section; and an assembly of flow deswirling vanes is arranged in the gas outlet conduit between the outer surface of the central body and the inner surface of the wall of the central gas outlet conduit for deswirling the gas enriched fraction (G) in the gas outlet conduit.

14. The cyclonic separator of claim 11, wherein a plurality of swirl-imparting vanes are arranged in a section of the annular fluid inlet conduit in which the fluid inlet tube has a larger inner diameter than other parts of the fluid inlet tube and are configured to induce the fluid to swirl at a subsonic velocity through the annular fluid inlet conduit and the trumpet-shaped proximal end of the vortex tube provides an annular throat section which is configured to accelerate the fluid mixture to a substantially transonic or supersonic velocity.

15. The cyclonic separator of claim 9, wherein the degassed liquid outlet conduit is connected to a gravity separation assembly comprising mechanical weirs under and over flow systems for separating the oil, water and residual gas discharged by the degassed liquid outlet conduit.

* * * * *